Nov. 15, 1927. 1,648,989
D. R. LAMONT
ELECTRICAL MEASURING INSTRUMENT
Filed March 24, 1924
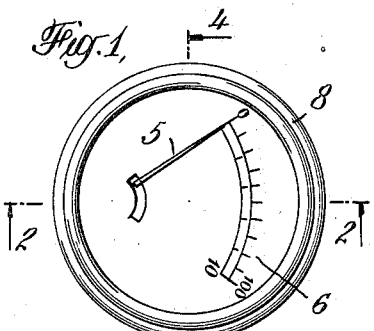
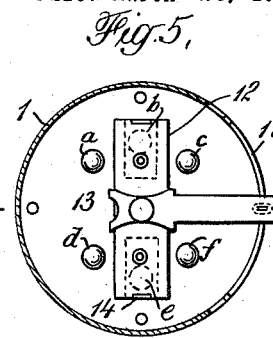
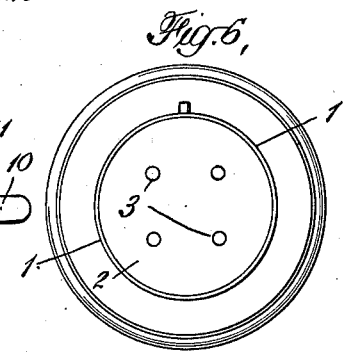
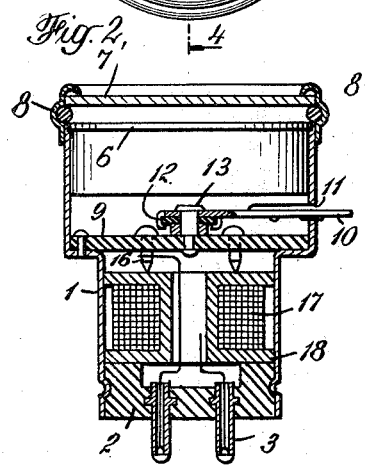
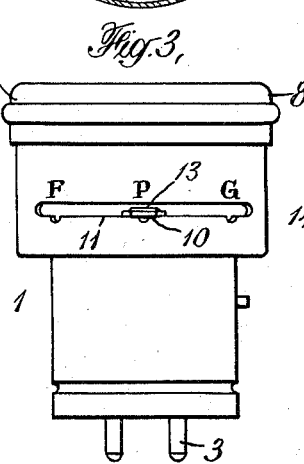
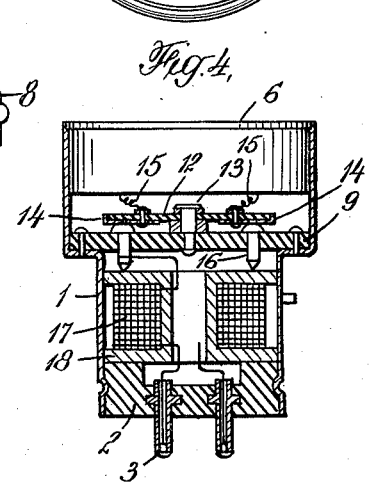
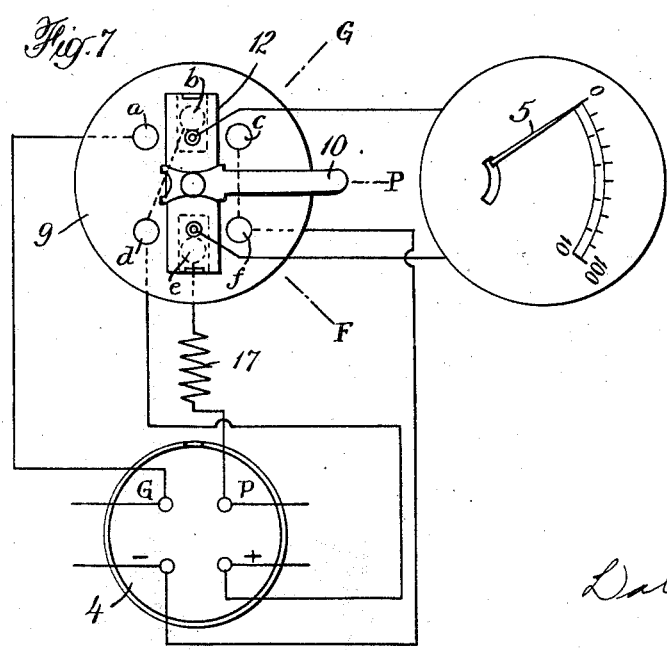
INVENTOR
Dallas R. Lamont Patented Nov. 15, 1927.

1,648,989

UNITED STATES PATENT OFFICE.

DALLAS R. LAMONT, OF BROOKLYN, NEW YORK.

ELECTRICAL MEASURING INSTRUMENT.

Application filed March 24, 1924. Serial No. 701,307.

The present invention relates to an electrical measuring instrument and has to do particularly with an instrument for use in radio sets for the purpose of checking the correctness of connections and indicating the condition of the various batteries employed in the set.

The energy required for operating radio receiving sets is commonly derived from batteries, either dry cells or storage cells. A relatively low voltage battery, commonly designated as the A battery, is used to supply the energizing current for the filament of the vacuum tubes used as the detector and the amplifiers. A B-battery usually consisting of a considerable number of small dry cells connected in series is used to maintain the plates of the respective vacuum tubes at a positive potential with respect to their filaments. Some times also a C battery is employed in the grid circuit of each of the amplifier tubes to insure that the grid will be at negative potential with respect to the filament. The satisfactory operation of the set demands that these respective batteries be connected into the circuits at the proper points and with correct polarity. The operation of the set also depends upon the condition of the batteries, and the condition of the batteries is in turn reflected by the voltages present across their terminals.

It is common practice at the present time to use voltmeters for checking the condition of batteries. These instruments are widely recommended for use in home radio sets. As furnished to the trade, these voltmeters are provided with a pair of leads or with one lead and a point on the casing of the instrument which may conveniently be used as a contact point. The instruments are used by placing the leads or contacts on the respective points whose difference in potential is to be measured. This system is open to the objection that the points across which the voltage is to be measured are usually built in as a part of the radio set and are hard to reach with the terminals of the instrument. A further objection is that many owners of home radio sets are not sufficiently familiar with the operation of electrical instruments to intelligently use a voltage measuring instrument in this fashion. To overcome this latter objection, it has been proposed to mount the volt meter on the panel carrying the dials and other instruments of the set. This leads at once, however, to an important objection, namely, that if the meter is built permanently into the circuit, it is at all times during the operation of the set drawing current and thus unnecessarily discharging the battery as well as consuming energy which would otherwise be utilized in detecting and reproducing signals. Even if a switch be provided to connect the meter into the circuit at will, the leads of the meter are built permanently into the set and introduce additional capacities and inductances which exert an undesirable influence on the operation of the set.

It is an object of the present invention to provide an instrument by which in a moment's time the condition of the respective batteries of a radio set may be determined, the operation of the instrument being so simple that it can be safely and intelligently used by the most inexperienced. The instrument of this invention does not offer the objection of being connected into the circuits of the instrument during operation, unnecessarily drawing current from the batteries or affecting the constants of the circuits.

The present invention contemplates mounting a suitable voltage indicating element in association with a base similar to a vacuum tube base so that the instrument may be inserted directly into any of the vacuum tube sockets of the set in the same fashion that a vacuum tube is inserted. Vacuum tube sockets as sold to the trade are provided with four terminals to which the various circuits of the radio set are connected. The present invention contemplates the provision of a switching arrangement incorporated as a part of the instrument itself by means of which the volt meter element may be successively placed in electrical connection with respective pairs of the vacuum tube socket terminals. With this arrangement it is possible by merely inserting the instrument into a vacuum tube socket and moving the instrument switch successively into its various positions to read on the voltmeter dial indications which are a measure of the conditions of the various batteries in the set. The entire operation is accomplished by a single insertion of the instrument into the socket and movement of the switch provided on the instrument successively into its respective positions.

In addition to determining the condition of the batteries the instrument will also indicate whether the batteries are connected up properly. In case a connection has been reversed the indication on the voltmeter will cause the needle to move off the scale in a reverse direction, thereby indicating the error. Likewise if a battery has been connected up in the wrong circuit the instrument will discover the error. A common source of damage to radio equipment is a mistake in connections which places the B battery voltage across the filament of the vacuum tube. If with such an error in connection, the vacuum tube is placed in the socket its filament will be burned out and the tube destroyed. The connections may be checked with the present instrument by merely inserting it in the vacuum tube socket and turning the switch to its respective positions. If when the switch is in position to measure the filament voltage its registers say 25 volts (which may be the magnitude of the plate voltage) it is evident that the B battery has been connected across the filament and the connection should be changed before inserting the vacuum tube.

It is a further object to provide an instrument to check connections and battery voltages as above described which constitutes a self-contained unit adapted for insertion into a vacuum tube socket and arranged to record the voltages across the respective terminals of the vacuum tube by merely turning a switch provided on the instrument, the entire unit being of size comparable with the size of a vacuum tube and being capable of manufacture at a cost sufficiently low to permit its ready sale as an accessory for use in connection with home radio sets.

I have illustrated a preferred embodiment of my invention in the accompanying drawings in which Figure 1 is a plan view of the instrument; Figure 2 is a vertical sectional view taken on line 2—2 of Figure 1; Figure 3 is an elevational view of the apparatus; Figure 4 is a vertical sectional view taken on line 4—4 of Figure 1 at right angles to the view illustrated in Figure 2; Figure 5 is a transverse sectional view showing the switch mechanism; Figure 6 is a plan view taken from the bottom of the apparatus and Figure 7 is a diagrammatic view illustrating the circuit connections.

Referring to the drawings, 1 indicates the casing of the instrument which may conveniently be an integral casing formed from suitable sheet metal and designed to house all of the parts of the apparatus. The bottom of the casing 1 is closed by means of a base 2 of hard rubber or other suitable insulating material. Four terminals 3 extend down from the base member 2 and constitute the terminal contacts of the instrument which are adapted to fit into the four cooperating elements provided on the vacuum tube socket 4 as indicated diagrammatically in Figure 7. The external lower portion of the instrument resembles the construction of a vacuum tube base, and the instrument may be inserted into a vacuum tube socket in the same fashion that a vacuum tube is placed in the socket. The upper portion of the casing 1, here shown of somewhat larger diameter than the lower portion, is designed to house the indicating element of the instrument which may conveniently be a small volt meter of the well known magnetic vane type which is widely employed at the present time for voltage measurements in connection with radio apparatus. The indicating member 5 of the instrument moves along a suitable scale provided on the instrument dial 6, the pointer being protected by a cover glass 7 held in place by a suitable retaining rim 8 as indicated in Figure 2.

Supported on an insulating disc 9 within the casing 1 is a switch mechanism for placing the indicating element in electrical connection with the respective pairs of terminals 3, so that the various voltages across the respective terminals may be measured. The switch is operated by means of a handle 10 extending thru a slot 11 provided in the side of the casing 1. Fixedly secured to the inner end of the switch arm 10 is a bar 12 of insulating material having a rotatable fit over the central supporting element or pivot 13. At its under side the switch bar 12 is provided with strips or contacts 14 of electrically conducting material, one of these contacts being provided at each end of the bar. The contacts 14 are in electrical connection with leads 15, as shown in Figure 4, which leads are in direct connection with the voltage indicating element.

Cooperating with the switch bar 12 and its contacts 14 are a plurality of switch points 16 which are here shown as escutcheon pins fitted thru suitable holes in the supporting disc 9. Three such contact points 16 are provided under each end of the switch bar 12. The purpose of providing this number of contact pins is to secure an arrangement of connections such that the various terminals whose difference of potential is measured will be connected to the indicating element with like polarity. To accomplish this result, certain of the contact pins 16 are interconnected. Referring to Figure 7, these pins are numbered, a, b, c, d, e and f. Pins c and f are interconnected and pins b and d are interconnected. When the instrument is inserted into the vacuum tube socket 4, the terminals 3 will be in electrical connection with the various circuits of the apparatus which enter the socket. The four contact points on a standard vacuum tube socket are always designated as indicated in Figure 7, namely as "P," "+," "—," "G". The voltage present across the terminals marked "P" and "+" is the voltage of the plate circuit of the apparatus; the voltage across the terminals marked "+" and "—" is the filament voltage; and the voltage across the terminals marked "—" and "G" is the grid voltage. When the circuits of the radio apparatus are properly connected the polarity across these respective pairs of terminals is in the direction just stated; namely, the terminal "P" is positive with respect to the terminal "+", the terminal "+" is positive with respect to the terminal "—", and the treminal "—" is positive with respect to the terminal "G".

As indicated in Figure 7, the connections are so arranged that when the instrument is inserted into the tube socket 4, the switch point e is in connection with the terminal "P"; the interconnected switch points b and d are in connection with the terminal "+"; the interconnected switch points c and f are in connection with the terminal "—"; and the switch point a is in connection with the terminal "G". In the position of the switch shown; namely, its middle position, the contacts 14 of the switch bar 12 rest upon switch points b and e and therefore the indicating element will record the voltage of the plate circuit. The casing 1 of the instrument is marked with the letter P corresponding to this middle switch position, as shown in Figure 3, thus indicating that when the switch is in this position the reading observed pertains to the plate circuit. If the switch is moved in a clockwise direction from the position indicated in Figure 7, the indicating element will be subjected to the potential across contact points c and d and will therefore read the filament voltage, the polarity of this reading being the same as for the plate voltage reading. If the switch be turned in a counterclockwise direction from the position indicated in Figure 7, the indicating element will be subjected to the potential difference across contact points a and f with the result that the voltage of the grid circuit will be measured. By this switching means it is therefore possible to successively impress upon the voltage indicating element the voltages of the respective circuits entering the vacuum tube socket.

It will be understood that the vacuum tube socket 4 may be connected into the various circuits of the radio apparatus in exactly the fashion employed for normal operation or the various terminals of the socket may lead directly to the A, B and C batteries of the set so that the voltage measurements at the socket will record the actual voltages of the respective bateries. In case the measurements are made with the sockets connected up for normal operation of the apparatus, the voltage readings at the terminals will be somewhat lower than the actual battery voltages due to the potential drop caused by resistances, such as for instance the transformer windings, which are in circuit with the batteries. With this situation, however, a reliable indication of the battery voltage may be obtained by furnishing calibration charts with the instrument indicating the readings which should be obtained on the instrument for various standard radio sets or standard transformers. For a special individual set the instrument may readily be calibrated by testing the various batteries when they are new, noting the readings produced on the instrument and then using these readings as a standard. If subsequent readings fall below these values, the batteries are shown to be deteriorating. The reading corresponding to the grid circuit will usually be rather low due to the presence of the secondary winding of the transformer in series with the C battery, so that the measurement is not an accurate indication of the actual voltage of the battery. It may even be feasible, under certain circumstances to eliminate the grid circuit measurement and confine the observations to the plate and filament circuits. It will be remembered that all of these voltage measurements are intended primarily to be merely indications of the condition of the batteries rather than to be accurate indications of the exact voltages present across the battery terminals.

In addition to indicating battery conditions, the instrument serves also as a check on the correctness of the connections of the set. In case of a reverse connection the instrument, when introduced into the socket in the usual fashion, will give a reverse reading and thus indicate that the particular circuit upon which that reading is taken is reversely connected. Likewise, if when the switch is moved say to the position marked F in Figure 3 the indication should be say 40 volts, it is apparent that the B battery has been connected across the filament terminals of the socket and that therefore such connection must be changed in order to avoid burning out of the filament of the tube.

The instrument here shown is provided with two scales, one a 0 to 100 volt scale, the other a 0 to 10 volt scale. The filament and grid circuit readings are both taken on the 0 to 10 volt scale for the reason that the magnitudes of the voltages in these circuits never exceed 10 volts. A multiplier 17 is connected in series with that terminal 3 of the instrument which contacts with the portion "P" of the socket 4, so that the multiplier changes the instrument scale to the 0 to 100 volt range during the measurement of the plate circuit voltage. As indicated in Figure 2, the multiplier 17 is wound on a suitable insulating spool 18 housed in the lower portion of the casing 1. The connections from three of the terminals 3 to the contact pins 16 pass up thru the hollow space at the center of the spool 18 while the remaining terminal 3 is connected in series with the multiplier winding 17 as shown.

The specification and drawings illustrate a preferred embodiment of the invention, but certain structural changes may be made within the scope of the appended claims. It is the intent of the invention to provide a portable instrument of the type described of small bulk and low manufacturing cost which may be inserted into a vacuum tube socket after the fashion of a vacuum tube and easily and intelligently operated by the most inexperienced to indicate the voltages present across the respective socket terminals.

I claim:

1. An electrical measuring instrument for obtaining measurements at a socket having a plurality of terminals comprising an indicating element, means for effecting a connection between said element and the terminals of the socket, and means for altering said connection to thereby indicate measurements upon different combinations of said terminals.

2. An electrical measuring instrument of the class described comprising a plurality of terminals for introduction into a socket, an indicating element, and means interposed between said indicating element and said terminals for placing said indicating element successively in electrical connection with various of said terminals.

3. An electrical measuring instrument of the class described comprising a plurality of terminals for introduction into a socket, indicating elements of different scale range associated therewith and means interposed between said indicating elements and said terminals for placing said indicating elements in electrical connection with different combinations of said terminals.

4. An electrical measuring instrument of the class described comprising a housing for enclosing the parts of the instrument, a plurality of terminals for introduction into a socket, an indicating element and means within said housing for placing said indicating element in electrical connection with different combinations of said terminals.

5. An electrical measuring instrument for use in radio apparatus having a plate circuit and a filament circuit, comprising terminals for introduction into a vacuum tube socket in electrical connection with the said respective circuits entering said socket, an indicating element associated with said terminals, switching means in said instrument for independently placing said indicating element in connection with the terminals of the plate circuit and the filament circuit of the apparatus, and a multiplier incorporated within said instrument for inclusion in the instrument circuit during measurements involving the said plate circuit, two scales being provided on said indicating element for use respectively with said multiplier in circuit and out of circuit.

6. An electrical measuring instrument of the class described, comprising terminals for introduction into a vacuum tube socket in electrical connection with the plate, grid and filament circuits entering said socket, an indicating element associated with said terminals and switching means for subjecting said indicating element independently to the voltage of said plate circuit, said filament circuit and said grid circuit, said switching means connecting each of said circuits to the indicating element with the same polarity.

7. An electrical measuring instrument for obtaining measurements at the terminals of a vacuum tube socket, comprising indicating elements of different scale range, members adapted for introduction into said socket in electrical connection with the plate and filament circuits entering said socket, connections between said indicating elements and said members and means for altering said connections for indicating upon the element of low scale range measurements taken upon the filament circuit, and indicating upon the element of higher scale range measurements taken upon the plate circuit.

8. An electrical measuring instrument for obtaining measurements at a socket having a plurality of terminals comprising indicating means appropriate for indicating the magnitudes of the measurements to be taken, means adapted for introduction directly into the socket into electrical connection with the terminals thereof, connections between said means and said indicating means and means for altering said connections whereby measurements upon different combinations of said socket terminals may be obtained.

9. An electrical measuring instrument of the class described, comprising terminals for introduction into a socket in electrical connection with circuits entering said socket, indicating means of appropriate scale ranges, connections between said indicating means and said terminals and means for altering said connections whereby indications on said indicating means, dependent respectively on the conditions present in said circuits, are obtained.

In testimony whereof I affix my signature.

DALLAS R. LAMONT.